US011212222B2

(12) United States Patent
Du et al.

(10) Patent No.: US 11,212,222 B2
(45) Date of Patent: *Dec. 28, 2021

(54) DATA SENDING METHOD AND FORWARDING DEVICE (71) Applicant: Huawei Technologies Co., Ltd., Shenzhen (CN)

(72) Inventors: Zongpeng Du, Shenzhen (CN); Guoyi Chen, Beijing (CN); Jie Dong, Beijing (CN); Xinyuan Wang, Beijing (CN); Jun Gong, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 17/132,755

(22) Filed: Dec. 23, 2020

(65) Prior Publication Data

US 2021/0119912 A1    Apr. 22, 2021

Related U.S. Application Data (63) Continuation of application No. 16/240,398, filed on Jan. 4, 2019, now Pat. No. 10,904,141, which is a (Continued)

(51) Int. Cl.
*H04L 12/741* (2013.01)
*H04L 12/721* (2013.01)
(Continued)

(52) U.S. Cl.
CPC .............. *H04L 45/54* (2013.01); *G06K 7/01* (2013.01); *H04J 3/1658* (2013.01);
(Continued)

(58) Field of Classification Search
CPC ........... H04Q 11/04; H04Q 3/68; G06K 7/01; G06K 7/10039
See application file for complete search history.

(56) References Cited

U.S. PATENT DOCUMENTS 7,570,657 B1    8/2009  Lo
2004/0109465 A1    6/2004  Kim et al.
(Continued)

FOREIGN PATENT DOCUMENTS

CN    101212396 A    7/2008
CN    101212424 A    7/2008
(Continued)

OTHER PUBLICATIONS

"Flex Ethernet, Implementation Agreement," IA # OIF-FLEXE-01.0, Mar. 2016, 31 pages.
(Continued)

*Primary Examiner* — Kyung H Shin
(74) *Attorney, Agent, or Firm* — Conley Rose, P.C.

(57) ABSTRACT

A data sending method includes receiving, by a forwarding device using a first flexible Ethernet (FlexE) group and in multiple timeslots included in a first timeslot set, multiple first encoded data blocks from a physical coding sublayer (PCS), determining, by the forwarding device according to the timeslots included in the first timeslot set and the first FlexE group, a second FlexE group and multiple timeslots included in a second timeslot set, and sending, by the forwarding device, the first encoded data blocks using the second FlexE group and in the timeslots included in the second timeslot set.

20 Claims, 4 Drawing Sheets

Related U.S. Application Data continuation of application No. PCT/CN2016/088931, filed on Jul. 6, 2016.

(51) Int. Cl.
| | | |
|---|---|---|
| *H04L 29/02* | (2006.01) | |
| *H04L 12/52* | (2006.01) | |
| *H04J 3/16* | (2006.01) | |
| *H04L 12/46* | (2006.01) | |
| *H04Q 3/68* | (2006.01) | |
| *G06K 7/01* | (2006.01) | |
| *H04L 12/417* | (2006.01) | |
| *H04L 12/715* | (2013.01) | |

(52) U.S. Cl.
CPC ........ *H04L 12/417* (2013.01); *H04L 12/4625* (2013.01); *H04L 12/52* (2013.01); *H04L 29/02* (2013.01); *H04L 45/64* (2013.01); *H04L 45/66* (2013.01); *H04Q 3/68* (2013.01)

(56) References Cited

U.S. PATENT DOCUMENTS

| | | | |
|---|---|---|---|
| 2004/0120327 A1 | 6/2004 | Son et al. | |
| 2009/0245289 A1* | 10/2009 | Sprague | H04Q 11/04 370/498 |
| 2012/0033678 A1 | 2/2012 | Page et al. | |
| 2013/0106582 A1* | 5/2013 | Kangas | G06K 7/01 340/10.2 |
| 2016/0119075 A1 | 4/2016 | Gareau et al. | |
| 2016/0119076 A1 | 4/2016 | Gareau | |
| 2016/0191277 A1 | 6/2016 | Li et al. | |
| 2016/0197743 A1 | 7/2016 | Su et al. | |
| 2016/0315634 A1 | 10/2016 | Mei et al. | |
| 2016/0315793 A1 | 10/2016 | Chen et al. | |
| 2017/0005742 A1 | 1/2017 | Gareau et al. | |
| 2017/0085474 A1 | 3/2017 | Hughes et al. | |
| 2017/0142008 A1 | 5/2017 | Yoo et al. | |
| 2018/0013511 A1 | 1/2018 | Hussain et al. | |
| 2019/0140943 A1 | 5/2019 | Du et al. | |
| 2019/0173856 A1 | 6/2019 | Gareau et al. | |

FOREIGN PATENT DOCUMENTS

| | | |
|---|---|---|
| CN | 101582910 A | 11/2009 |
| CN | 102891813 A | 1/2013 |
| CN | 103875205 A | 6/2014 |
| CN | 104426631 A | 3/2015 |
| CN | 105009540 B | 6/2018 |
| CN | 105264778 B | 4/2019 |
| EP | 0939576 A2 | 9/1999 |
| EP | 3013017 A1 | 4/2016 |

OTHER PUBLICATIONS

"FlexE Implementation Agreement-Draft 1.3," XP044165967, ITU-T Draft; Study Period 2013-2016, International Telecommunication Union, Feb. 5, 2016, pp. 1-32.

Hussain, I., et al., "FlexE Usecases," draft-hussain-ccamp-flexe-usecases-00.txt, Jun. 20, 2016, pp. 1-18, XP015113586.

Wang, Q., Ed., et al., "Framework and Requirements for GMPLS-based Control of Flexible Ethernet Network," draft-wang-ccamp-flexe-fwk-00.txt, Mar. 8, 2016, pp. 1-14, XP015111592.

Braden, R., et al, "Resource ReSerVation Protocol (RSVP)—Version 1 Functional Specification," RFC 2205, Sep. 1997, 112 pages.

Awduche, D., et al, "RSVP-TE: Extensions to RSVP for LSP Tunnels," RFC 3209, Dec. 2001, 61 pages.

Kompella, K., et al. "Procedures for Modifying the Resource reSerVation Protocol (RSVP)," RFC 3936, Oct. 2004. 7 pages.

Wang, Q., et al., "RSVP-TE Signaling Extensions in support of Flexible Ethernet networks;" draft-wang-ccamp-flexe-signaling-01.txt, Mar. 21, 2016, pp. 1-12, XP015112041.

ITU-T G.709/Y.1331 "Series G: Transmission Systems and Media, Digital Systems and Networks, Digital terminal equipments—General Series Y: Global Information Infrastructure, Internet Protocol Aspects and Next-Generation Networks, Internet of Things and Smart Cities, Internet protocol aspects—Transport, Interfaces for the optical transport network," Jun. 2016, 244 pages.

Alcatel-Lucent USA, "Mapping of Flex Ethernet Clients over OTN," ITU-T Draft; Study Period 2013-2016, International Telecommunication Union, Geneva; CH, vol. 11/15, XP044136865, Jun. 6, 2015, 7 pages.

* cited by examiner

FIG. 6

DATA SENDING METHOD AND FORWARDING DEVICE

CROSS-REFERENCE TO RELATED APPLICATIONS

This application is a continuation of U.S. patent application Ser. No. 16/240,398 filed on Jan. 4, 2019, which is a continuation of International Patent Application No. PCT/CN2016/088931 filed on Jul. 6, 2016. Both of the aforementioned applications are hereby incorporated by reference in their entireties.

TECHNICAL FIELD

The present disclosure relates to the communications field, and in particular, to a data sending method and a forwarding device.

BACKGROUND

Introduction of a concept of a flexible Ethernet (FlexE) provides a feasible evolution direction for Ethernet physical link virtualization. In the FlexE, one or more bonded physical layers (PHYs) constitute a FlexE group. The FlexE group may be considered as a FlexE link between a sending device and a receiving device. The FlexE link is a logical link. Bandwidth of the logical link is equal to a sum of bandwidth of the multiple bonded PHYs. In a FlexE technical solution, bandwidth resources of the FlexE group are used by performing timeslot configuration (for example, 20 or 80 timeslots are configured), and a virtual link is implemented by performing timeslot configuration such that the FlexE provides a service to a FlexE client.

When a sending device and a receiving device transmit a FlexE client using a virtual link supported by the FlexE group, the sending device may encode, according to a 64-bit data to 66-bit line code (64B/66B) structure, an Ethernet frame corresponding to the FlexE client in order to obtain 64B/66B data blocks. Under the control of a FlexE shim, the FlexE client is transferred over a transport network.

After receiving the FlexE client, the receiving device needs to perform forwarding in a conventional layer 2 (link layer) or layer 3 (network layer) forwarding mode according to a layer 2 or layer 3 forwarding table. Therefore, a delay is relatively large.

SUMMARY

Embodiments of the present disclosure provide a data sending method in which multiple timeslots are determined, and multiple first encoded data blocks are sent in the multiple timeslots in order to reduce a delay.

According to a first aspect, a data sending method is provided, including respectively receiving, by a forwarding device using a first FlexE group and in multiple timeslots included in a first timeslot set, multiple first encoded data blocks (encoded data block) generated by a physical coding sublayer (PCS), where the multiple first encoded data blocks are in a one-to-one correspondence with the multiple timeslots in the first timeslot set, determining, by the forwarding device according to the multiple timeslots included in the first timeslot set and the first FlexE group, a second FlexE group and multiple timeslots included in a second timeslot set, and respectively sending, by the forwarding device, the multiple first encoded data blocks using the second FlexE group and in the multiple timeslots included in the second timeslot set, where the multiple first encoded data blocks are in a one-to-one correspondence with the multiple timeslots included in the second timeslot set.

According to the data sending method in this embodiment of the present disclosure, a forwarding device determines multiple timeslots in a second timeslot set and a second FlexE group that are corresponding to multiple timeslots in a first timeslot set and a first FlexE group such that the forwarding device can map encoded data blocks received using the first FlexE group and in the multiple timeslots in the first timeslot set into the multiple timeslots in the second timeslot set, and send the encoded data blocks using the second FlexE group. That is, the forwarding device may determine the multiple timeslots, and send the multiple first encoded data blocks in the multiple timeslots. Therefore, the forwarding device does not need to process 64B/66B data blocks according to a conventional layer 2 (link layer) or layer 3 (network layer) forwarding mode in order to reduce a processing delay, and reduce a transmission delay.

In a possible implementation manner, determining, by the forwarding device according to the multiple timeslots included in the first timeslot set and the first FlexE group, a second FlexE group and multiple timeslots included in a second timeslot set includes determining, by the forwarding device by searching a first mapping table, the second FlexE group and the multiple timeslots included in the second timeslot set, where the first mapping table includes a mapping relationship between the first FlexE group and the multiple timeslots included in the first timeslot set, and between the second FlexE group and the multiple timeslots included in the second timeslot set.

In a possible implementation manner, determining, by the forwarding device according to the multiple timeslots included in the first timeslot set and the first FlexE group, a second FlexE group and multiple timeslots included in a second timeslot set includes determining, by a first physical interface card (PIC) in the forwarding device by searching a second mapping table, an identifier of a first channel that corresponds to the multiple timeslots included in the first timeslot set and the first FlexE group, where the second mapping table includes a mapping relationship between the multiple timeslots included in the first timeslot and the first FlexE group, and the identifier of the first channel, and the first channel is a channel between the first PIC and a first network processor (NP) in the forwarding device, determining, by the first NP by searching a third mapping table, a first subinterface corresponding to the identifier of the first channel, where the first subinterface corresponds to the second FlexE group, and the third mapping table includes a mapping relationship between the identifier of the first channel and the first subinterface, determining, by a second NP in the forwarding device by searching a fourth mapping table, an identifier of a second channel that corresponds to the first subinterface, where the fourth mapping table includes a mapping relationship between the first subinterface and the identifier of the second channel, and the second channel is a channel between the second NP and a second PIC in the forwarding device, and determining, by the second PIC by searching a fifth mapping table, the multiple timeslots included in the second timeslot set that are corresponding to the identifier of the second channel, where the fifth mapping table includes a mapping relationship between the identifier of the second channel and the multiple timeslots included in the second timeslot set.

In a possible implementation manner, after receiving, by a forwarding device using a first FlexE group and in multiple timeslots included in a first timeslot set, multiple first encoded data blocks generated by a PCS, the method may further include generating, by the first PIC, a target data packet according to the multiple first encoded data blocks.

In a possible implementation manner, generating, by the first PIC, a target data packet according to the multiple first encoded data blocks includes reassembling, by the first PIC, the multiple first encoded data blocks to restore one or more target data packets, where the target data packet is an Ethernet frame.

In this embodiment of the present disclosure, the received encoded data blocks are reassembled first to restore the Ethernet frame, and then timeslot mapping and forwarding are performed such that modifications to an architecture of an existing forwarding device can be reduced.

In a possible implementation manner, generating, by the first PIC, a target data packet according to the multiple first encoded data blocks includes encapsulating, by the forwarding device, every N encoded data blocks in the multiple first encoded data blocks to generate the target data packet.

The method in which multiple data packets are buffered and encapsulated into a relatively large data packet and then are forwarded can improve transmission efficiency of the forwarding device.

In a possible implementation manner, after determining, by a first PIC in the forwarding device by searching a second mapping table, an identifier of a first channel corresponding to the multiple timeslots included in the first timeslot set and the first FlexE group, the method further includes adding, by the first PIC, the identifier of the first channel to the target data packet, and sending, by the first PIC to the first NP using the first channel, the data packet to which the identifier of the first channel is added, and after determining, by a second NP in the forwarding device by searching a fourth mapping table, an identifier of a second channel corresponding to the first subinterface, the method further includes adding, by the second NP, the identifier of the second channel to the target data packet, and sending, by the second NP to the second PIC using the second channel, the data packet to which the identifier of the second channel is added.

In a possible implementation manner, the method may further include receiving, by the forwarding device using the first FlexE group and in multiple timeslots included in a third timeslot set, multiple second encoded data blocks generated by the PCS, where the multiple second encoded data blocks are in a one-to-one correspondence with the multiple timeslots in the third timeslot set, and generating, by the forwarding device, an Ethernet frame according to the multiple second encoded data blocks, and performing layer 2 processing on the Ethernet frame, or performing layer 3 processing on an Internet Protocol packet included in the Ethernet frame.

In a possible implementation manner, the multiple first encoded data blocks are 64B/66B data blocks.

According to a second aspect, a forwarding device is provided, and is configured to execute the method in the first aspect or any possible implementation manner of the first aspect. Further, the forwarding device includes units configured to execute the method in the first aspect or any possible implementation manner of the first aspect.

According to a third aspect, a forwarding device is provided. The forwarding device includes a receiver, a transmitter, a processor, a memory, and a bus system. The receiver, the transmitter, the processor, and the memory are connected using the bus system. The memory is configured to store an instruction. The processor is configured to execute the instruction stored in the memory in order to control the receiver to receive a signal and control the transmitter to send a signal. In addition, when the processor executes the instruction stored in the memory, the processor executes the method in the first aspect or any possible implementation manner of the first aspect.

According to a fourth aspect, this application provides a computer readable medium. The computer readable medium is configured to store a computer program. The computer program includes an instruction used to execute the method in the first aspect or any possible implementation manner of the first aspect.

BRIEF DESCRIPTION OF DRAWINGS

To describe the technical solutions in some of the embodiments of the present disclosure more clearly, the following briefly describes the accompanying drawings describing some of the embodiments. The accompanying drawings in the following description merely show some embodiments of the present disclosure, and persons of ordinary skill in the art can derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. The described embodiments are some but not all of the embodiments of the present disclosure. Based on the embodiments in the present disclosure, persons of ordinary skill in the art may derive other embodiments without creative efforts.

The following briefly describes the technical terms used in the embodiments of the present disclosure.

A FlexE client is an Ethernet flow. For the Ethernet flow, an Ethernet media access control (MAC) rate corresponds to or not corresponding to an Ethernet PHY rate.

A FlexE group is a group of from 1 to n bonded Ethernet PHYs, where a value of n is equal to 254. For example, the FlexE group may be one bonded Ethernet PHY. The FlexE group may be two bonded Ethernet PHYs. The FlexE group may be five bonded Ethernet PHYs.

For the one bonded Ethernet PHY, one send PHY is bonded to a receive PHY. The number of send PHYs is equal to the number of receive PHYs.

For multiple bonded Ethernet PHYs, multiple send PHYs are respectively bonded to multiple receive PHYs. The number of multiple send PHYs is equal to the number of multiple receive PHYs.

The send PHY is a PHY used for sending data.

The receive PHY is a PHY used for receiving data.

All PHYs in this application are Ethernet PHYs.

For a FlexE, the FlexE client, and the FlexE group, refer to the FlexE 1.0 Implementation Agreement published by the Optical Internetworking Forum on March, 2016. The FlexE 1.0 Implementation Agreement is incorporated into this application in its entirety.

A logical link is a link established on a physical link. One physical link may be divided into multiple logical links. Alternatively, multiple physical links may constitute one logical link.

Technical solutions provided in the embodiments of the present disclosure may be applied to a backbone network, a convergence network, an access network, an enterprise network, a mobile fronthaul network, or a backhaul network.

A data sending method in this embodiment of the present disclosure may be applied to a FlexE. In a FlexE scenario, each bonded Ethernet PHY in a FlexE group transmits an encoded data block flow in a period of 20 timeslots. There is an overhead code block at an interval of 1023 groups of encoded data blocks in the encoded data block flow. The overhead code block occupies 66 bits. Each group of encoded data blocks generally includes 20 64B/66B encoded data blocks. The 20 64B/66B data blocks are respectively transmitted in 20 timeslots. When a sending device and a receiving device transmit a FlexE client using a virtual link supported by the FlexE group, timeslot resources occupied by the virtual link may be determined based on a timeslot configuration table corresponding to each bonded Ethernet PHY in the FlexE group, and then these timeslot resources are used to transmit the FlexE client to the receiving device.

Figure 1:
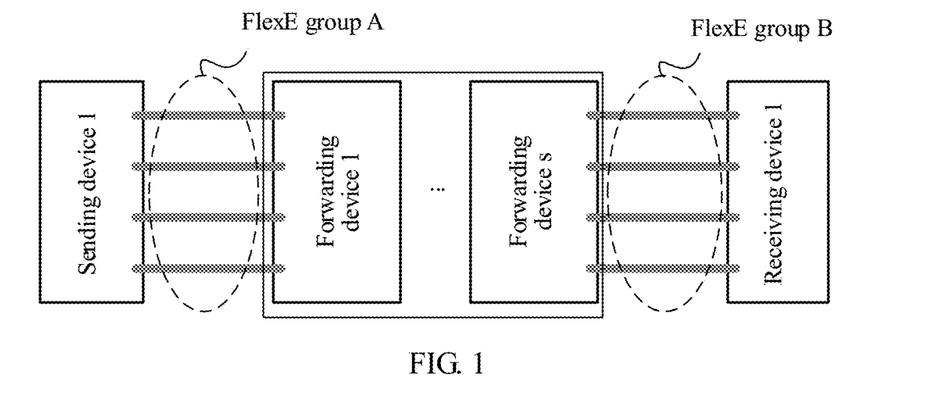
FIG. 1 is a schematic diagram of an application scenario according to an embodiment of the present disclosure.

FIG. 1 is a schematic diagram of an application scenario according to an embodiment of the present disclosure. As shown in FIG. 1, a sending device 1, a receiving device 1, and s forwarding devices (a forwarding device 1 to a forwarding device s) are included, where s is an integer greater than 1. A FlexE link is established between the sending device 1 and the forwarding device 1 using a FlexE group A. A FlexE link is established between the forwarding device s and the receiving device 1 using the FlexE group B. A FlexE link is also established between two adjacent forwarding devices. The receiving device and the sending device transmit a FlexE client using the forwarding device 1 to the forwarding device s.

In a technical solution, when the sending device 1 and the receiving device 1 transmit a FlexE client using the forwarding device 1 to the forwarding device s, each one of the forwarding device 1 to the forwarding device s needs to generate an Ethernet frame according to encoded data blocks, and perform layer 2 processing or layer 3 processing on the Ethernet frame. Therefore, a delay is relatively large.

To improve transmission efficiency, an embodiment of the present disclosure provides a data sending method. The following gives detailed description with reference to FIG. 2.

Figure 2:
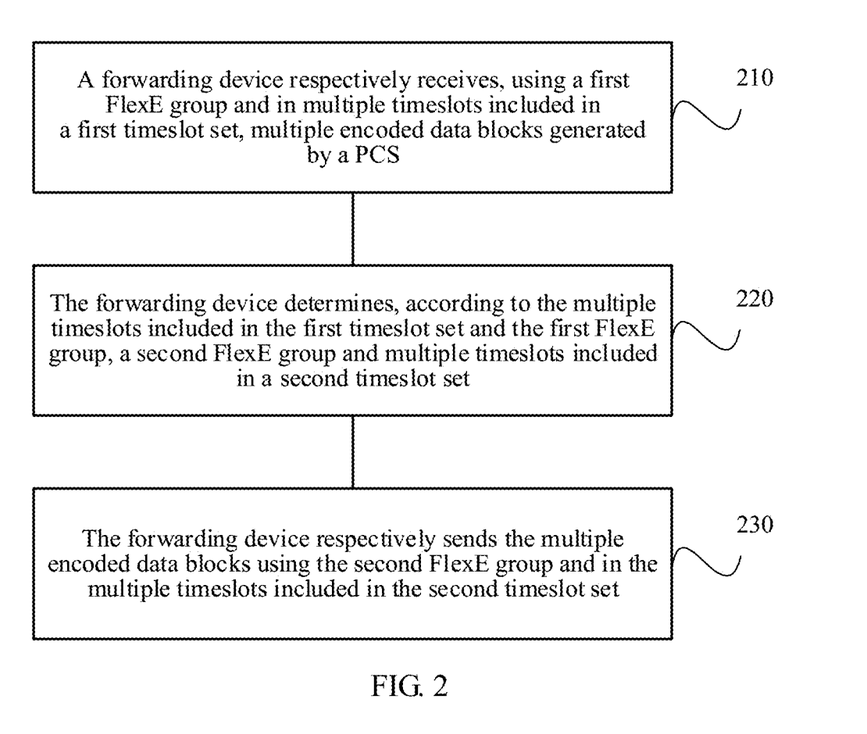
FIG. 2 is a schematic flowchart of a data sending method according to an embodiment of the present disclosure.

FIG. 2 is a schematic flowchart of a data sending method according to an embodiment of the present disclosure.

It should be understood that a timeslot used in this embodiment of the present disclosure may be a calendar slot. For details of the calendar slot, refer to the FlexE 1.0 Implementation Agreement.

Step 210. A forwarding device respectively receives, using a first FlexE group and in multiple timeslots included in a first timeslot set, multiple first encoded data blocks generated by a PCS.

For example, the first FlexE group includes one or more send PHYs. The first FlexE group includes one or more receive PHYs. The send PHY in the first FlexE group is bonded to the receive PHY in the first FlexE group. The forwarding device includes the receive PHY in the first FlexE group. A sending device includes the send PHY in the first FlexE group. The forwarding device is a next-hop device of the sending device.

For example, the multiple first encoded data blocks may be generated after the PCS of the sending device encodes an Ethernet frame corresponding to a FlexE client. For example, the multiple first encoded data blocks may be multiple 64B/66B data blocks or multiple 8-bit data to 10-bit line code (8B/10B) data blocks.

In this embodiment of the present disclosure, the forwarding device and the sending device may establish a logical link using the first FlexE group. The sending device may send the multiple first encoded data blocks using the first FlexE group and in the multiple timeslots included in the first timeslot set. The forwarding device may receive, using the first FlexE group and in the multiple timeslots included in the first timeslot set, the multiple first encoded data blocks sent by the sending device.

Further, the multiple first encoded data blocks are in a one-to-one correspondence with the multiple timeslots in the first timeslot set. The forwarding device may receive, using the first FlexE group and in the multiple timeslots in the first timeslot set, the multiple first encoded data blocks corresponding to the FlexE client.

For example, the first FlexE group may be a FlexE group 1, and the multiple timeslots in the first timeslot set may include timeslots 0, 2, 4, and 5. The sending device may respectively transmit, using the FlexE group 1 and in the timeslots 0, 2, 4, and 5 in each period, the multiple first encoded data blocks generated by the PCS of the sending device. The forwarding device may respectively receive the multiple first encoded data blocks using the FlexE group 1 and in the timeslots 0, 2, 4, and 5 in each period.

Herein, for example, during time domain resource allocation, time domain resources may be divided into multiple periods. Each period in the multiple periods may include 20 timeslots, which are a timeslot 0 to a timeslot 19 respectively. Duration of each timeslot may be 1 millisecond (ms). Duration of a period may be 20 ms.

It should be understood that in this embodiment of the present disclosure, the forwarding device may be any one of the s forwarding devices shown in FIG. 1. The forwarding device may be a device that has a function of forwarding a FlexE client. For example, the forwarding device may be a router or a switch. In this embodiment of the present disclosure, for example, when the forwarding device is a forwarding device 2, the sending device is the forwarding device 1. When the forwarding device is the forwarding device 1, the sending device is the sending device 1.

Step 220. The forwarding device determines, according to the multiple timeslots included in the first timeslot set and the first FlexE group, a second FlexE group and multiple timeslots included in a second timeslot set.

For example, the second FlexE group includes one or more send PHYs. The second FlexE group includes one or more receive PHYs. The send PHY in the second FlexE group is bonded to the receive PHY in the second FlexE group. The forwarding device includes the send PHY in the second FlexE group. A receiving device includes the receive PHY in the second FlexE group.

Herein, the multiple timeslots in the second timeslot set are in a one-to-one correspondence with the multiple timeslots in the first timeslot set.

The second FlexE group is a FlexE group used by the forwarding device to send the multiple first encoded data blocks. The multiple timeslots included in the second timeslot set are timeslots used when the forwarding device sends the multiple first encoded data blocks. A forwarding path may be determined by determining the second FlexE group and the second timeslot set that are corresponding to the first FlexE group and the first timeslot set.

In this embodiment of the present disclosure, the forwarding device may pre-store a forwarding table. The forwarding table may store a correspondence between the multiple timeslots included in the first timeslot set and the first FlexE group, and a correspondence between the second FlexE group and the multiple timeslots included in the second timeslot set.

Further, the forwarding table in the forwarding device may store a correspondence between first information and second information. The first information includes the multiple timeslots included in the first timeslot set and the first FlexE group. The second information includes the second FlexE group and the multiple timeslots included in the second timeslot set.

Further, a logical link may be established between the forwarding device and the receiving device. The logical link may be the second FlexE group. The forwarding device may send the multiple first encoded data blocks using the second FlexE group and in the multiple timeslots included in the second timeslot set. The receiving device may receive, using the second FlexE group and in the multiple timeslots included in the second timeslot set, the multiple first encoded data blocks sent by the forwarding device.

For example, the second FlexE group may be a FlexE group 3, and the second timeslot set may include timeslots 1, 3, 5, and 7. The forwarding device may respectively send the multiple first encoded data blocks using the FlexE group 3 and in timeslots 1, 3, 5, and 7 in each period. The receiving device may respectively receive the multiple first encoded data blocks using the FlexE group 3 and in the timeslots 1, 3, 5, and 7 in each period.

In this embodiment of the present disclosure, method 1 or method 2 may be used when the forwarding device determines the second FlexE group and the multiple timeslots included in the second timeslot set. The following describes method 1 and method 2 in detail.

For example, in this embodiment of the present disclosure, when the forwarding device is the forwarding device 2 shown in FIG. 1, and s is greater than 2, the receiving device is a forwarding device 3. When the forwarding device is the forwarding device s, the receiving device is the receiving device 1. The receiving device may receive, using the second FlexE group and in the multiple timeslots included in the second timeslot set, the multiple first encoded data blocks sent by the forwarding device. The receiving device may generate, according to the multiple first encoded data blocks, an Ethernet frame corresponding to the FlexE client.

Step 230. The forwarding device respectively sends the multiple first encoded data blocks using the second FlexE group and in the multiple timeslots included in the second timeslot set.

Further, the forwarding device may respectively receive, using the first FlexE group and in the multiple timeslots included in the first timeslot set, the multiple first encoded data blocks sent by the sending device. After determining the second FlexE group and the multiple timeslots included in the second timeslot set, the forwarding device may respectively send the multiple first encoded data blocks using the second FlexE group and in the multiple timeslots included in the second timeslot set. That is, the forwarding device may determine the multiple timeslots, and send the multiple first encoded data blocks in the multiple timeslots. Therefore, the forwarding device does not need to process received data according to a conventional layer 2 (link layer) or layer 3 (network layer) forwarding mode. Therefore, the foregoing technical solution helps reduce a forwarding delay.

Optionally, the method may further include respectively receiving, by the forwarding device using the first FlexE group and in multiple timeslots included in a third timeslot set, multiple second encoded data blocks generated by the PCS, where the multiple second encoded data blocks are in a one-to-one correspondence with the multiple timeslots in the third timeslot set, and generating, by the forwarding device, an Ethernet frame according to the multiple second encoded data blocks, and performing layer 2 processing on the Ethernet frame, or performing layer 3 processing on an Internet Protocol packet included in the Ethernet frame.

Herein, the multiple second encoded data blocks may be generated after the PCS of the sending device encodes an Ethernet frame corresponding to another FlexE client. For example, the multiple second encoded data blocks may be multiple 64B/66B data blocks or multiple 8B/10B data blocks.

Further, the forwarding device may process, in a conventional manner, the multiple second encoded data blocks received using the first FlexE group and in the multiple timeslots included in the third timeslot set. That is, the forwarding device first restores the Ethernet frame according to the second encoded data blocks, and then performs layer 2 processing on the restored Ethernet frame, or performs layer 3 processing on the Internet Protocol packet included in the Ethernet frame.

In this embodiment of the present disclosure, method 1 may be used when the forwarding device determines, according to the multiple timeslots included in the first timeslot set and the first FlexE group, the second FlexE group and the multiple timeslots included in the second timeslot set.

Method 1:

The forwarding device may first search a first mapping table that is pre-established and stored by the forwarding device, and then determine the second FlexE group and the multiple timeslots included in the second timeslot set.

Further, the first mapping table records a mapping relationship between an inbound FlexE group and an inbound timeslot set, and between an outbound FlexE group and an outbound timeslot set. The forwarding device may determine, by searching the first mapping table, the second FlexE group and the multiple timeslots included in the second timeslot set.

Figure 3:
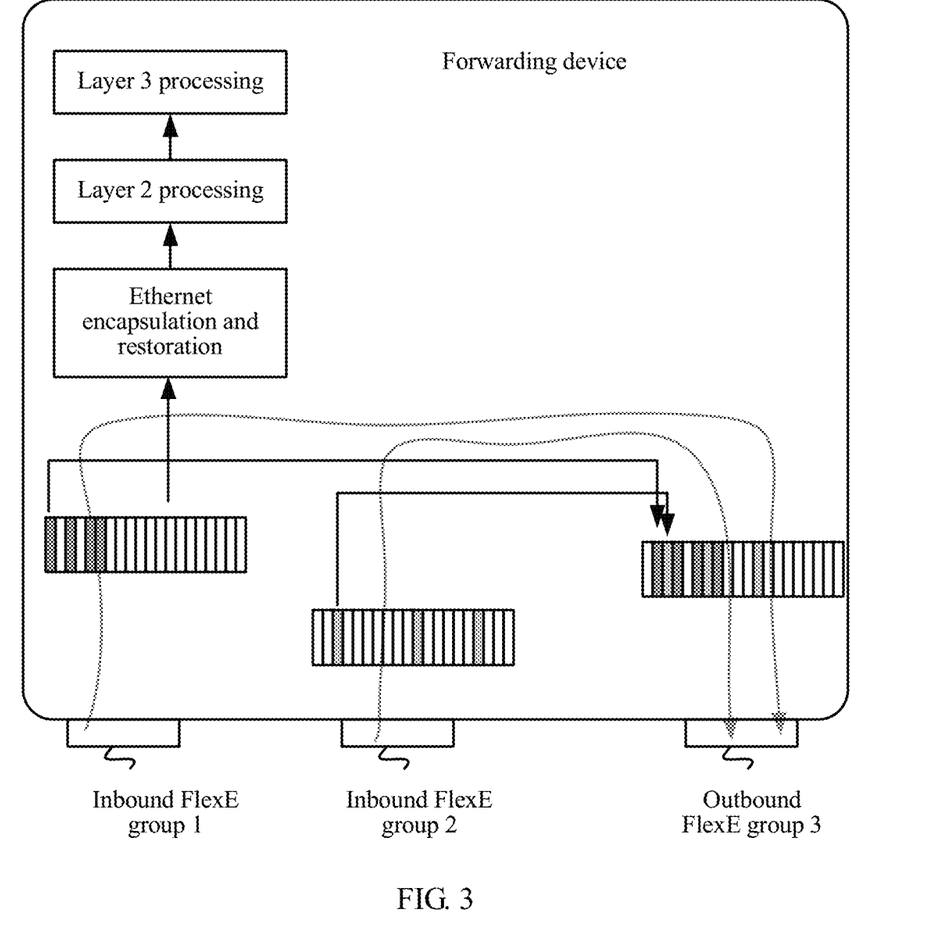
FIG. 3 is a schematic block diagram of a data sending method according to an embodiment of the present disclosure.

The following describes method 1 in detail with reference to FIG. 3 and Table 1.

A specific form of the first mapping table may be shown in FIG. 1. It should be understood that an inbound FlexE group in Table 1 represents a FlexE group used by the forwarding device to receive encoded data blocks, and is represented using a FlexE group number. An inbound timeslot set includes timeslots used by the forwarding device to receive the encoded data blocks, and is represented using a timeslot number. An outbound FlexE group represents a FlexE group used by the forwarding device to send the encoded data blocks, and is represented using a FlexE group number. An outbound timeslot set includes timeslots used by the forwarding device to send the encoded data blocks, and is represented using a timeslot number. It should be further understood that the inbound FlexE group and the outbound FlexE group are different FlexE groups. The inbound FlexE group is a FlexE group connected between the forwarding device and the sending device. The outbound FlexE group is a FlexE group connected between the forwarding device and the receiving device.

TABLE 1

| Inbound FlexE group | Inbound timeslot set | Outbound FlexE group | Outbound timeslot set |
|---|---|---|---|
| 1 | 0, 2, 4, 5 | 3 | 1, 3, 5, 7 |
| 1 | 1, 3, 6 to 19 | none | |
| 2 | 2, 10, 16 | 3 | 2, 6, 11 |
| 2 | 0, 1, 3 to 9, 11 to 15, 17 to 19 | none | |
| ... | ... | ... | ... |

With reference to Table 1 and FIG. 3, for example, when the first FlexE group is the inbound FlexE group 1, and the first timeslot set includes the timeslots 0, 2, 4, and 5, it may be determined that the second FlexE group is the outbound FlexE group 3, and the second timeslot set includes the timeslots 1, 3, 5, and 7. Further, the forwarding device may receive, using the inbound FlexE group 1 connected to the sending device and in the timeslots 0, 2, 4, and 5, the multiple first encoded data blocks generated by the PCS of the sending device. After the forwarding device determines the second FlexE group and the second timeslot set by searching the first mapping table, the forwarding device may send the multiple first encoded data blocks using the outbound FlexE group 3 connected to the receiving device and in the timeslots 1, 3, 5, and 7. If there are multiple forwarding devices on the forwarding path, each forwarding device may receive and forward the multiple first encoded data blocks according to a mapping table stored in each forwarding device. After receiving the multiple first encoded data blocks, the receiving device may restore the FlexE client corresponding to the multiple first encoded data blocks. In addition, for the multiple second encoded data blocks received using the inbound FlexE group 1 and in the timeslots, for example, timeslots 1, 3, and 6 to 19, included in the third inbound timeslot set, it is determined that there is no corresponding outbound FlexE group. In this case, the forwarding device performs Ethernet encapsulation and restoration on the multiple second encoded data blocks received in the timeslots 1, 3, and 6 to 19. Further, the multiple second encoded data blocks received in the inbound timeslots 1, 3, and 6 to 19 are reassembled to generate an Ethernet frame. Then, the forwarding device may perform layer 2 processing or layer 3 processing on the Ethernet frame.

For another example, when the first FlexE group is the inbound FlexE group 2, and the first timeslot set includes the timeslots 2, 10, and 16, it may be determined that the second FlexE group is the outbound FlexE group 3, and the second timeslot set includes the timeslots 2, 6, and 11. Further, the forwarding device may receive, using the inbound FlexE group 2 connected to the sending device and in the timeslots 2, 10, and 16, the multiple first encoded data blocks generated by the PCS of the sending device. After the forwarding device determines the second FlexE group and the second timeslot set by searching the first mapping table, the forwarding device may send the multiple first encoded data blocks using the outbound FlexE group 3 connected to the receiving device and in the timeslots 2, 6, and 11. If there are multiple forwarding devices on the forwarding path, each forwarding device may perform receiving and sending according to a mapping table stored in each forwarding device. After receiving the multiple first encoded data blocks, the receiving device may restore the FlexE client corresponding to the multiple first encoded data blocks. In addition, for the multiple second encoded data blocks received using the inbound FlexE group 2 and in the timeslots, for example, timeslots 0, 1, 3 to 9, 11 to 15, and 17 to 19, included in the third timeslot set, it is determined that there is no corresponding outbound FlexE group. In this case, the forwarding device may perform Ethernet encapsulation and restoration on the multiple second encoded data blocks received in the inbound timeslots 0, 1, 3 to 9, 11 to 15, and 17 to 19. Further, the multiple second encoded data blocks received in the timeslots 0, 1, 3 to 9, 11 to 15, and 17 to 19 are reassembled to restore an Ethernet frame, and then layer 2 or layer 3 processing is performed.

It should be understood that the first mapping table shown in Table 1 is merely an example for description, and shall not constitute any limitation on the present disclosure. The first mapping table established by the forwarding device includes the inbound FlexE group, the inbound timeslot set, the outbound FlexE group, and the outbound timeslot set. However, Table 1 may not necessarily be an expression form of the first mapping table. Alternatively, the forwarding device may represent the first mapping table using Table 1 or using another form different from Table 1.

Therefore, according to the data sending method in this embodiment of the present disclosure, a forwarding device directly maps a FlexE client corresponding to multiple first encoded data blocks received using a first FlexE group and in multiple timeslots in a first timeslot set into multiple timeslots in a second timeslot set, and performs forwarding using a second FlexE group such that a processing delay caused by an operation of reassembling the received first encoded data blocks to restore an Ethernet frame and an operation of performing layer 2 or layer 3 processing on the Ethernet frame can be reduced, thereby improving transmission efficiency.

Figure 4:
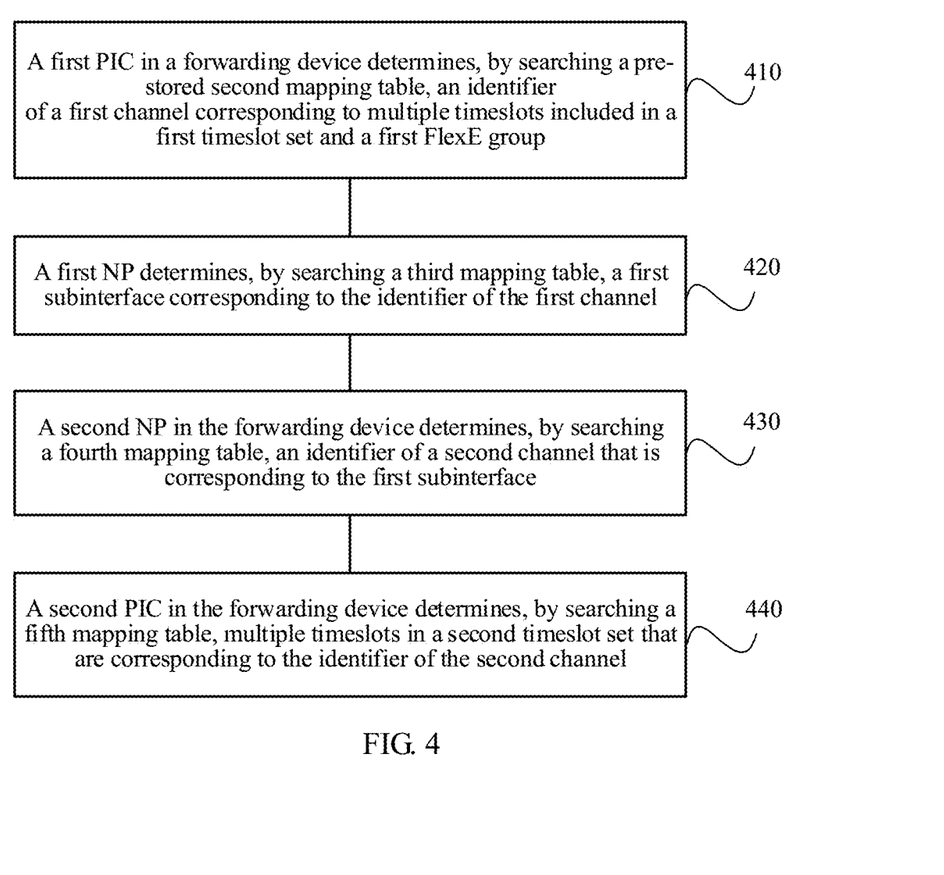
FIG. 4 is a schematic flowchart of a data sending method according to another embodiment of the present disclosure.

In step 220, method 2 may be further used when the forwarding device determines, according to the multiple timeslots included in the first timeslot set and the first FlexE group, the second FlexE group and the multiple timeslots included in the second timeslot set. Method 2 is shown in FIG. 4.

Method 2:

Step 410. A first PIC in the forwarding device determines, by searching a pre-stored second mapping table, an identifier of a first channel corresponding to the multiple timeslots included in the first timeslot set and the first FlexE group.

The second mapping table is stored in the first PIC, that is, an inbound PIC in the forwarding device, and records a mapping relationship between the multiple first timeslots included in the first timeslot set and the first FlexE group, and the identifier of the first channel. The first channel is a channel between the first PIC and a first NP in the forwarding device. The first encoded data blocks may be transmitted from the first PIC to the first NP using the first channel.

Step 420. A first NP determines, by searching a third mapping table, a first subinterface corresponding to the identifier of the first channel.

The third mapping table is stored in the first NP in the forwarding device, that is, an inbound NP in the forwarding device, and records a mapping relationship between the identifier of the first channel and the first subinterface. Herein, the first subinterface corresponds to the second FlexE group. The second FlexE group may be corresponding to multiple subinterfaces. After the first subinterface is determined, the second FlexE group is determined.

Step 430. A second NP in the forwarding device determines, by searching a fourth mapping table, an identifier of a second channel corresponding to the first subinterface.

The fourth mapping table is stored in the second NP in the forwarding device, that is, an outbound NP in the forwarding device, and records a mapping relationship between the first subinterface and the identifier of the second channel. The second channel is a channel between the second NP and a second PIC in the forwarding device. The first encoded data blocks may be transmitted from the second NP to the second PIC using the second channel.

Step 440. A second PIC in the forwarding device determines, by searching a fifth mapping table, the multiple timeslots in the second timeslot set that are corresponding to the identifier of the second channel.

The fifth mapping table is stored in the second PIC in the forwarding device, that is, an outbound PIC in the forwarding device, and records a mapping relationship between the identifier of the second channel and the corresponding multiple timeslots in the second timeslot set.

Further, in this embodiment of the present disclosure, different units, for example, the first NP and the first PIC, in the forwarding device may pre-store different mapping tables. During data forwarding, different units in the forwarding device determine, by searching mapping tables stored by the units, the second FlexE group and the multiple timeslots included in the second timeslot set, and forward the corresponding multiple first encoded data blocks using the second FlexE group and in the multiple timeslots included in the second timeslot set.

The following describes the method shown in FIG. 4 in detail with reference to FIG. 3, Table 2, Table 3, Table 4, and Table 5.

Specific forms of the second mapping table, the third mapping table, the fourth mapping table, and the fifth mapping table may be respectively shown in Table 2, Table 3, Table 4, and Table 5. It should be understood that in the following tables, an inbound FlexE group represents a FlexE group used by the forwarding device to receive encoded data blocks, and is represented using a FlexE group number. An inbound timeslot set includes timeslots used by the forwarding device to receive the encoded data blocks, and is represented using a timeslot number. An inbound interface channel represents a channel between the first NP and the first PIC. An outbound interface channel represents a channel between the second NP and the second PIC. The inbound interface channel is different from the outbound interface channel.

TABLE 2

| Inbound FlexE group | Inbound timeslot set | Inbound interface channel |
| --- | --- | --- |
| 1 | 0, 2, 4, 5 | 1 |
| 1 | 1, 3, 6 to 19 | none |
| 2 | 2, 10, 16 | 2 |
| 2 | 0, 1, 3 to 9, 11 to 15, 17 to 19 | none |
| . . . | . . . | . . . |

TABLE 3

| Inbound interface channel | Subinterface |
| --- | --- |
| 1 | 1 |
| 2 | 2 |
| . . . | . . . |

TABLE 4

| Subinterface | Outbound interface channel |
| --- | --- |
| 1 | 3 |
| 2 | 5 |
| . . . | . . . |

TABLE 5

| Outbound interface channel | Outbound timeslot set |
| --- | --- |
| 3 | 1, 3, 5, 7 |
| 5 | 2, 6, 11 |
| . . . | . . . |

In this embodiment of the present disclosure, that the first FlexE group is the FlexE group 1, the multiple timeslots included in the first timeslot set are the inbound timeslots 0, 2, 4, and 5, and the multiple timeslots included in the third timeslot set are the inbound timeslots 1, 3, and 6 to 19 are used as an example for description.

When successively receiving the multiple first encoded data blocks using the first FlexE group 1 and in the multiple timeslots 0, 2, 4, and 5 in the first timeslot set, the first PIC may determine, by searching Table 2, that an inbound interface channel corresponding to the FlexE group 1 and the multiple timeslots 0, 2, 4, and 5 in the first timeslot set is the inbound interface channel 1. It should be understood that the inbound interface channel 1 is an example of the first channel. Then, it may be determined, by searching Table 3, that a subinterface corresponding to the inbound interface channel 1 is the subinterface 2. It should be understood that the subinterface 2 is an example of the first subinterface, and determining the subinterface is equivalent to determining the second FlexE group, that is, the FlexE group 2 herein. The second NP may determine, by searching Table 4, that an outbound interface channel corresponding to the subinterface 2 is the outbound interface channel 3. It should be understood that the outbound interface channel 3 is an example of the second channel. The second PIC may determine, by searching Table 5, that the multiple timeslots included in the second timeslot set that are corresponding to the outbound interface channel 3 are the outbound timeslots 1, 3, 5, and 7. In this way, the forwarding device may forward, using the FlexE group 2 and in the outbound timeslots 1, 3, 5, and 7 respectively, the multiple first encoded data blocks received using the first FlexE group 1 and in the inbound timeslots 0, 2, 4, and 5. In addition, when successively receiving the multiple second encoded data blocks using the FlexE group 1 and in the multiple timeslots 1, 3, and 6 to 19 in the third timeslot set, the first PIC may determine, by searching Table 2, that there is no inbound interface channel corresponding to the FlexE group 1 and the multiple timeslots 1, 3, and 6 to 19 in the third timeslot set. In this case, the forwarding device reassembles the multiple second encoded data blocks received in the timeslots 1, 3, and 6 to 19 to generate an Ethernet frame.

Then, the forwarding device may perform layer 2 processing or layer 3 processing on the Ethernet frame.

It should be understood that Table 2 shown in the foregoing is merely an example for description, and shall not constitute any limitation on the present disclosure. In this embodiment of the present disclosure, the forwarding device may represent the second mapping table using Table 2 or using another form different from Table 2. Correspondingly, Table 3, Table 4, and Table 5 in the foregoing are also merely examples for description, and shall not constitute any limitation on the present disclosure.

Therefore, according to the data sending method in this embodiment of the present disclosure, a forwarding device directly maps a FlexE client corresponding to multiple first encoded data blocks received using a first FlexE group and in multiple timeslots in a first timeslot set into multiple timeslots in a second timeslot set, and performs forwarding using a second FlexE group such that a processing delay caused by an operation of reassembling the received first encoded data blocks to restore an Ethernet frame and an operation of performing layer 2 or layer 3 processing on the Ethernet frame can be reduced, thereby improving transmission efficiency.

Optionally, after the forwarding device respectively receives, using the first FlexE group and in the multiple timeslots included in the first timeslot set, the multiple first encoded data blocks generated by the PCS, the method may further include generating, by the first PIC, a target data packet according to the multiple first encoded data blocks.

Further, there are two cases in which the first PIC generates the target data packet according to the multiple first encoded data blocks.

Case 1: The first PIC reassembles the multiple received first encoded data blocks, to restore the Ethernet frame.

Further, the first PIC may first reassemble the multiple received first encoded data blocks, to restore the Ethernet frame. The first PIC adds the identifier of the first channel to each Ethernet frame by searching Table 2, and transmits each Ethernet frame to the first NP using the first channel. The first NP sends the Ethernet frame to the second NP by searching Table 3. Herein, the second NP corresponds to the subinterface. It should be noted that the Ethernet frame that is being transmitted does not carry the identifier of the first channel. After receiving the Ethernet frame, the second NP adds the identifier of the second channel to each Ethernet frame by searching Table 3, and transmits each Ethernet frame to the second PIC using the second channel. The second PIC encodes the Ethernet frame, maps, by searching Table 5, the encoded data blocks into the multiple timeslots in the second timeslot set, and forwards the encoded data blocks using the second FlexE group. It should be further noted that the first encoded data blocks mapped into the multiple timeslots in the second timeslot set do not carry the identifier of the second channel.

It should be understood that the forwarding device may generate one or more Ethernet frames according to the multiple first encoded data blocks.

In this embodiment of the present disclosure, the received first encoded data blocks are reassembled first to restore the Ethernet frame, and then timeslot mapping and forwarding are performed such that modifications to an architecture of an existing forwarding device can be reduced.

Case 2: The first PIC encapsulates every N first encoded data blocks in the multiple received first encoded data blocks into a relatively large data packet. The relatively large data packet may be referred to as a target data packet.

Further, multiple buffers may be disposed in the forwarding device, and each buffer can buffer first encoded data blocks corresponding to a same FlexE client. During receiving, the forwarding device successively buffers, to a buffer according to a receiving sequence, the first encoded data blocks received using the first FlexE group and in the multiple timeslots in the first timeslot set. The forwarding device may specify a quantity N of buffered first encoded data blocks in advance. After the N first encoded data blocks are buffered, the first PIC encapsulates the N first encoded data blocks into a relatively large data packet. Then, the identifier of the first channel is added to the large data packet, and the data packet is transmitted to the first NP using the first channel. The first NP sends the large data packet to the second NP. The second NP then adds the identifier of the second channel to the relatively large data packet, and transmits the data packet to the second PIC using the second channel. The second PIC maps the N first encoded data blocks in the relatively large data packet into the multiple timeslots in the second timeslot set, and the N first encoded data blocks are forwarded using the second FlexE group.

A value of N is not limited in this embodiment of the present disclosure. For example, N may be 100 or may be 50.

It should be understood that a first encoded data block may be continuously received in the multiple timeslots included in the first timeslot set. Therefore, even if there is no actual data packet in a timeslot, the timeslot also needs to be counted when statistics about a quantity of buffered data blocks are collected.

The method in which multiple data packets are buffered and encapsulated into a relatively large data packet or restored to an Ethernet data packet, and then are forwarded can improve transmission efficiency of the forwarding device.

The foregoing describes the data sending method according to the embodiments of the present disclosure with reference to FIG. 1 to FIG. 4. The following describes a forwarding device according to the embodiments of the present disclosure with reference to FIG. 5 and FIG. 6.

Figure 5:
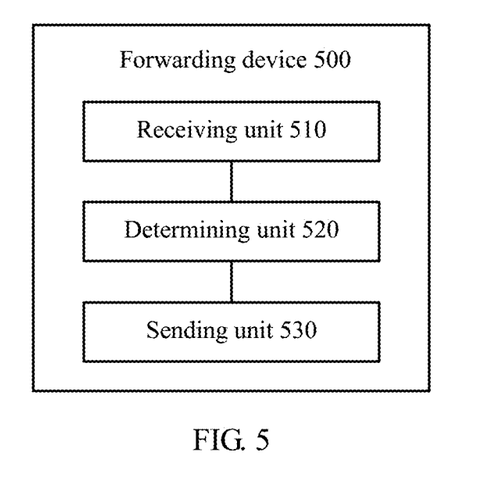
FIG. 5 is a schematic block diagram of a forwarding device according to an embodiment of the present disclosure.

FIG. 5 shows a schematic block diagram of a forwarding device 500 according to an embodiment of the present disclosure. As shown in FIG. 5, the forwarding device 500 includes a receiving unit 510, a determining unit 520, and a sending unit 530. The forwarding device 500 may be used to execute the method shown in FIG. 2. Alternatively, the forwarding device 500 may be used to perform steps performed by a forwarding device in the method shown in FIG. 4. For specific implementation of the forwarding device 500, refer to the foregoing description for FIG. 2 and FIG. 4, and details are not described herein again.

The receiving unit 510 is configured to respectively receive, using a first FlexE group and in multiple timeslots included in a first timeslot set, multiple first encoded data blocks generated by a PCS. The multiple first encoded data blocks are in a one-to-one correspondence with the multiple timeslots in the first timeslot set.

The determining unit 520 is configured to determine, according to the multiple timeslots included in the first timeslot set and the first FlexE group, a second FlexE group and multiple timeslots included in a second timeslot set.

The sending unit 530 is configured to respectively send the multiple first encoded data blocks using the second FlexE group and in the multiple timeslots included in the second timeslot set. The multiple first encoded data blocks are in a one-to-one correspondence with the multiple timeslots included in the second timeslot set.

All units of the forwarding device 500 in this embodiment of the present disclosure and the foregoing other operations or functions are separately for implementing corresponding procedures executed by a forwarding device in the foregoing method. For brevity, details are not described herein.

Therefore, the forwarding device in this embodiment of the present disclosure directly maps a FlexE client corresponding to multiple first encoded data blocks received using a first FlexE group and in multiple timeslots in a first timeslot set into multiple timeslots in a second timeslot set, and performs forwarding using a second FlexE group such that a processing delay caused by an operation of reassembling the received first encoded data blocks to restore an Ethernet frame and an operation of performing layer 2 or layer 3 processing on the Ethernet frame can be reduced, thereby improving transmission efficiency.

Figure 6:
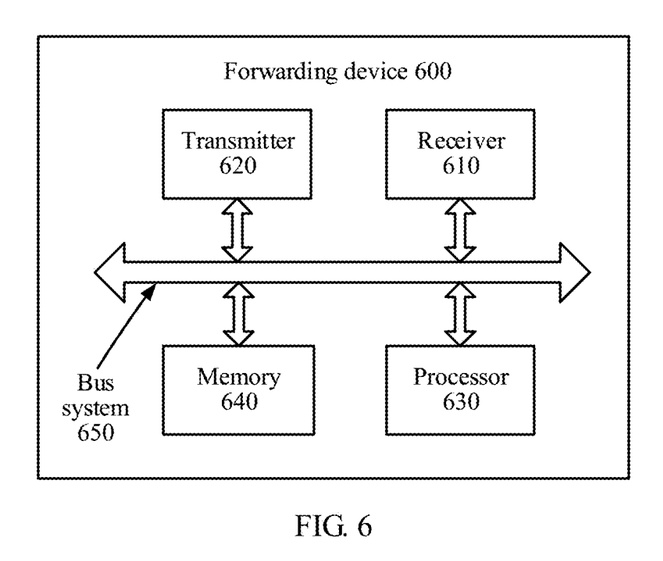
FIG. 6 is a schematic structural diagram of a forwarding device according to an embodiment of the present disclosure.

FIG. 6 is a schematic structural diagram of a forwarding device 600 according to an embodiment of the present disclosure. The forwarding device 600 may be used to implement the forwarding device 500 shown in FIG. 5. For specific implementation of the forwarding device 600, refer to the foregoing description for the forwarding device 500, and details are not described herein again. As shown in FIG. 6, the forwarding device 600 includes a receiver 610, a transmitter 620, a processor 630, a memory 640, and a bus system 650. The receiver 610, the transmitter 620, the processor 630, and the memory 640 are connected using the bus system 650. The memory 640 is configured to store an instruction. The processor 630 is configured to execute the instruction stored in the memory 640 in order to control the receiver 610 to receive a signal, and control the transmitter 620 to send a signal.

The receiver 610 is configured to respectively receive, using a first FlexE group and in multiple timeslots included in a first timeslot set, multiple first encoded data blocks generated by a PCS. The multiple first encoded data blocks are in a one-to-one correspondence with the multiple timeslots in the first timeslot set.

The processor 630 is configured to determine, according to the multiple timeslots included in the first timeslot set and the first FlexE group, a second FlexE group and multiple timeslots included in a second timeslot set.

The transmitter 620 is configured to respectively send the multiple first encoded data blocks using the second FlexE group and in the multiple timeslots included in the second timeslot set. The multiple first encoded data blocks are in a one-to-one correspondence with the multiple timeslots included in the second timeslot set.

It should be understood that, in this embodiment of the present disclosure, the processor 630 may be a central processing unit (CPU), or the processor 630 may be another general purpose processor, a digital signal processor (DSP), an application-specific integrated circuit (ASIC), a field programmable gate array (FPGA), or another programmable logic device, a discrete gate, or a transistor logic device, a discrete hardware component, or the like. The general purpose processor may be a microprocessor or the processor 630 may be any normal processor, or the like.

The memory 640 may include a read-only memory (ROM) and a random access memory (RAM), and provide an instruction and data to the processor 630. A part of the memory 640 may further include a nonvolatile RAM (NVRAM). For example, the memory 640 may further store device-type information.

In addition to a data bus, the bus system 650 may further include a power bus, a control bus, a status signal bus, and the like. However, for clarity of description, various buses are marked as the bus system 650 in the figure.

In an implementation process, the steps in the foregoing method may be completed using an integrated logic circuit of hardware in the processor 630 or using an instruction in a form of software. The steps of the data sending method disclosed with reference to the embodiments of the present disclosure may be directly completed by a hardware processor, or may be completed using a combination of hardware in the processor and a software module. The software module may be located in a mature storage medium in the field, such as a RAM, a flash memory, a ROM, a programmable ROM (PROM), an electrically-erasable PROM (EEPROM), or a register. The storage medium is located in the memory 640. The processor 630 reads information in the memory 640, and completes the steps of the foregoing method in combination with hardware of the processor 630. To avoid repetition, details are not described herein.

All units of the forwarding device 600 in this embodiment of the present disclosure and the foregoing other operations or functions are separately for implementing corresponding procedures executed by a forwarding device in the foregoing method. For brevity, details are not described herein.

Therefore, the forwarding device in this embodiment of the present disclosure directly maps a FlexE client corresponding to multiple first encoded data blocks received using a first FlexE group and in multiple timeslots in a first timeslot set into multiple timeslots in a second timeslot set, and performs forwarding using a second FlexE group such that a processing delay caused by an operation of reassembling the received first encoded data blocks to restore an Ethernet frame and an operation of performing layer 2 or layer 3 processing on the Ethernet frame can be reduced, thereby improving transmission efficiency.

It should be understood that the term "and/or" in this specification describes only an association relationship for describing associated objects and represents that three relationships may exist. For example, A and/or B may represent the following three cases, only A exists, both A and B exist, and only B exists. In addition, the character "/" in this specification generally indicates an "or" relationship between the associated objects.

It should be understood that sequence numbers of the foregoing processes do not mean execution sequences in various embodiments of the present disclosure. The execution sequences of the processes should be determined according to functions and internal logic of the processes, and should not be construed as any limitation on the implementation processes of the embodiments of the present disclosure.

Persons of ordinary skill in the art may be aware that, in combination with the examples described in the embodiments disclosed in this specification, units and algorithm steps may be implemented by electronic hardware or a combination of computer software and electronic hardware. Whether the functions are executed by hardware or software depends on particular applications and design constraint conditions of the technical solutions. Persons skilled in the art may use different methods to implement the described functions for each particular application.

It may be clearly understood by persons skilled in the art that, for the purpose of convenient and brief description, for a detailed working process of the foregoing system, apparatus, and unit, refer to a corresponding process in the foregoing method embodiments, and details are not described herein again.

In the several embodiments provided in the present application, it should be understood that the disclosed system, apparatus, and method may be implemented in other manners. For example, the described apparatus embodiment is merely an example. For example, the unit division is merely logical function division and there may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit.

When the functions are implemented in the form of a software function unit and sold or used as an independent product, the functions may be stored in a computer-readable storage medium. Based on such an understanding, the technical solutions of the present disclosure essentially, or the part contributing to other approaches, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present disclosure. The foregoing storage medium includes any medium that can store program code, such as a universal serial bus (USB) flash drive, a removable hard disk, a ROM, a RAM, a magnetic disk, or an optical disc.

What is claimed is:

1. A data transmitting method, implemented by a forwarding device, comprising:
    receiving a first encoded data block, from a sending device, using a first flexible Ethernet (FlexE) group and in a first timeslot, wherein the first FlexE group comprises at least one first send physical layers (PHYs) and at least one first receive PHYs, wherein the at least one first send PHYs is bonded to the at least one first receive PHYs in the first FlexE group, wherein the forwarding device comprises the at least one first receive PHYs in the first FlexE group, and wherein the forwarding device is a first next-hop device of the sending device; and
    sending, to a receiving device based on a mapping relationship between the first timeslot and a second timeslot, the first encoded data block using a second FlexE group and in the second timeslot,
    wherein the second FlexE group comprises at least one second send PHYs and at least one second receive PHYs,
    wherein the at least one second send PHYs is bonded to the at least one second receive PHYs in the second FlexE group,
    wherein the forwarding device comprises the at least one second send PHYs in the second FlexE group, and
    wherein the receiving device is a second next-hop device of the forwarding device.

2. The data transmitting method of claim 1, wherein before sending the first encoded data block, the data transmitting method further comprises searching a first mapping table comprising the first mapping relationship to determine the second FlexE group and the second timeslot.

3. The data transmitting method of claim 1, wherein the forwarding device comprises a first mapping table, and wherein the first mapping table comprises the first mapping relationship.

4. The data transmitting method of claim 1, further comprising:
    receiving, using the first FlexE group, a plurality of second encoded data blocks;
    generating an Ethernet frame based on the second encoded data blocks; and
    performing layer 2 processing on the Ethernet frame.

5. The data transmitting method of claim 1, further comprising:
    receiving, using the first FlexE group, a plurality of second encoded data blocks;
    generating an Ethernet frame based on the second encoded data blocks; and
    performing layer 3 processing on the Ethernet frame.

6. A forwarding device, comprising:
    a computer-readable storage medium configured to store instructions; and
    a processor coupled to the computer-readable storage medium and configured to execute the instructions to cause the forwarding device to:
        receive a first encoded data block, from a sending device, using a first flexible Ethernet (FlexE) group and in a first timeslot, wherein the first FlexE group comprises at least one first send physical layers (PHYs) and at least one first receive PHYs, wherein the at least one first send PHYs is bonded to the at least one first receive PHYs in the first FlexE group, wherein the forwarding device comprises the at least one first receive PHYs in the first FlexE group, and wherein the forwarding device is a first next-hop device of the sending device; and
        send, to a receiving device based on a first mapping relationship between the first timeslot and a second timeslot, the first encoded data block using a second FlexE group and in the second timeslot,
        wherein the second FlexE group comprises at least one second send PHYs and at least one second receive PHYs,
        wherein the at least one second send PHYs is bonded to the at least one second receive PHYs in the second FlexE group,
        wherein the forwarding device comprises the at least one second send PHYs in the second FlexE group, and
        wherein the receiving device is a second next-hop device of the forwarding device.

7. The forwarding device of claim 6, wherein before sending the first encoded data block, the processor is further configured to execute the instructions to cause the forwarding device to search a first mapping table comprising the first mapping relationship to determine the second FlexE group and the second timeslot.

8. The forwarding device of claim 6, further comprising a first mapping table, wherein the first mapping table comprises the first mapping relationship.

9. The forwarding device of claim 6, further comprising a first physical interface card (PIC), a second PIC, a first network processor (NP), and a second NP, wherein the processor is further configured to execute the instructions to cause the forwarding device to:
 determine, by the first PIC based on a second mapping relationship between the first timeslot, the first FlexE group, and a first identifier of a first channel, the first identifier corresponding to the first timeslot and the first FlexE group, wherein the first channel is between the first PIC and the first NP;
 determine, by the first NP based on a third mapping relationship between the first identifier and a first subinterface, the first subinterface corresponding to the first identifier, wherein the first subinterface corresponds to the second FlexE group;
 determine, by the second NP based on a fourth mapping relationship between the first subinterface and a second identifier of a second channel, the second identifier corresponding to the first subinterface, wherein the second channel is between the second NP and the second PIC; and
 determine, by the second PIC based on a fifth mapping relationship between the second identifier and the second timeslot, the second timeslot corresponding to the second identifier.

10. The forwarding device of claim 9, wherein the processor is further configured to execute the instructions to cause the forwarding device to generate, by the first NP, a target data packet based on the first encoded data block.

11. The forwarding device of claim 10, wherein the processor is further configured to execute the instructions to cause the forwarding device to:
 add, by the first PIC, the first identifier to the target data packet;
 send, by the first PIC using the first channel, the target data packet comprising the first identifier to the first NP;
 add, by the second NP, the second identifier to the target data packet; and
 send, by the second NP using the second channel, the target data packet comprising the second identifier to the second PIC.

12. The forwarding device of claim 6, wherein the processor is further configured to execute the instructions to cause the forwarding device to:
 receive, using the first FlexE group, a plurality of second encoded data blocks;
 generate an Ethernet frame based on the second encoded data blocks; and
 perform layer 2 processing on the Ethernet frame.

13. The forwarding device of claim 6, wherein the processor is further configured to execute the instructions to cause the forwarding device to:
 receive, using the first FlexE group, a plurality of second encoded data blocks;
 generate an Ethernet frame based on the second encoded data blocks; and
 perform layer 3 processing on the Ethernet frame.

14. A computer program product comprising instructions stored on a non-transitory computer-readable medium that, when executed by a processor, cause a forwarding device to:
 receive a first encoded data block, from a sending device, using a first flexible Ethernet (FlexE) group and in a first timeslot, wherein the first FlexE group comprises at least one first send physical layers (PHYs) and at least one first receive PHYs, wherein the at least one first send PHYs is bonded to the at least one first receive PHYs in the first FlexE group, wherein the forwarding device comprises the at least one first receive PHYs in the first FlexE group, and wherein the forwarding device is a first next-hop device of the sending device; and
 send, to a receiving device based on a first mapping relationship between the first timeslot and a second timeslot, the first encoded data block using a second FlexE group and in the second timeslot, wherein the second FlexE group comprises at least one second send PHYs and at least one second receive PHYs, wherein the at least one second send PHYs is bonded to the at least one second receive PHYs in the second FlexE group, wherein the forwarding device comprises the at least one second send PHYs in the second FlexE group, and wherein the receiving device is a second next-hop device of the forwarding device.

15. The computer program product of claim 14, wherein before sending the first encoded data block, the instructions further cause the forwarding device to search a first mapping table comprising the first mapping relationship to determine the second FlexE group and the second timeslot.

16. The computer program product of claim 14, wherein the forwarding device comprises a first mapping table, and wherein the first mapping table comprises the first mapping relationship.

17. The computer program product of claim 14, wherein the instructions further cause the forwarding device to:
 receive, using the first FlexE group, a plurality of second encoded data blocks;
 generate an Ethernet frame based on the second encoded data blocks; and
 perform layer 2 processing on the Ethernet frame.

18. The computer program product of claim 14, wherein the instructions further cause the forwarding device to:
 receive, using the first FlexE group, a plurality of second encoded data blocks;
 generate an Ethernet frame based on the second encoded data blocks; and
 perform layer 3 processing on the Ethernet frame.

19. The computer program product of claim 14, wherein the instructions further cause the forwarding device to:
 determine, by a first physical interface card (PIC) in the forwarding device based on a second mapping relationship between the first timeslot, the first FlexE group, and a first identifier of a first channel, the first identifier corresponding to the first timeslot and the first FlexE group, wherein the first channel is between the first PIC and a first network processor (NP) in the forwarding device;
 determine, by the first NP based on a third mapping relationship between the first identifier and a first subinterface, the first subinterface corresponding to the first identifier, wherein the first subinterface corresponds to the second FlexE group;
 determine, by a second NP in the forwarding device based on a fourth mapping relationship between the first subinterface and a second identifier of a second channel, the second identifier corresponding to the first subinterface, wherein the second channel is between the second NP and a second PIC in the forwarding device; and determine, by the second PIC based on a fifth mapping relationship between the second identifier and the second timeslot, the second timeslot corresponding to the second identifier.

20. The computer program product of claim 19, wherein after receiving the first encoded data block, the instructions further cause the forwarding device to generate, by the first PIC, a target data packet based on the first encoded data block.

* * * * *